March 24, 1953   L. W. PETERSEN   2,632,505
CONCENTRATION OF CHARRABLE HEAT-SENSITIVE LIQUIDS
Filed Aug. 26, 1949   4 Sheets-Sheet 1

INVENTOR.
Lowell W. Petersen
BY
R. H. Story
ATTORNEY

March 24, 1953  L. W. PETERSEN  2,632,505
CONCENTRATION OF CHARRABLE HEAT-SENSITIVE LIQUIDS
Filed Aug. 26, 1949  4 Sheets-Sheet 2

INVENTOR.
Lowell W. Petersen
BY
R. A. Story
ATTORNEY

March 24, 1953 L. W. PETERSEN 2,632,505
CONCENTRATION OF CHARRABLE HEAT-SENSITIVE LIQUIDS
Filed Aug. 26, 1949 4 Sheets-Sheet 3

INVENTOR.
Lowell W. Petersen
BY
R. G. Story
ATTORNEY

March 24, 1953  L. W. PETERSEN  2,632,505
CONCENTRATION OF CHARRABLE HEAT-SENSITIVE LIQUIDS
Filed Aug. 26, 1949

INVENTOR.
Lowell W. Petersen
BY
R. G. Story
ATTORNEY

Patented Mar. 24, 1953

2,632,505

UNITED STATES PATENT OFFICE 2,632,505

CONCENTRATION OF CHARRABLE HEAT-SENSITIVE LIQUIDS

Lowell W. Petersen, Chicago, Ill., assignor to Swift & Company, Chicago, Ill., a corporation of Illinois Application August 26, 1949, Serial No. 112,557

9 Claims. (Cl. 159—16)

This invention relates to a method and apparatus for the concentration of charrable heat-sensitive liquids, and more particularly it relates to a method of concentrating charrable heat-sensitive liquids by direct contact therewith of combustion gases which have been cooled to a point where charring of the liquid is avoided and to apparatus for carrying out the said method.

The concentration of heat-sensitive liquids in the past has generally been carried out through the use of jacketed vessels of various types wherein the heating medium was separated from the liquid to be concentrated by metal walls or the like. The principal reason for this has been the difficulty encountered in the prevention of charring or burning of the heat-sensitive liquids when direct contact of the heating gases with the liquid was provided. It is well known that direct gas contact with the liquid to be concentrated is a more efficient means of heat transfer, and, in addition, the bubbling of the gases through the liquid provides agitation thereof with a further gain in efficiency of heating. This direct contact, combustion gas type of concentration is widely used in the evaporation and concentration of certain inorganic liquids. However, the problem with respect to the concentration of organic liquids is much more difficult. Organic liquids, such as milk, whey, and the like, are extremely heat sensitive, and direct contact of hot combustion gases with such liquids has in the past resulted in considerable charring and burning of the material being concentrated. For example, when whey is being concentrated for use in animal foods, the resulting product of a direct contact, combustion gas evaporation is of a blackish-brown color due to charring rather than of the desirable light-brown, tan, or cream color of concentrated whey made by the less efficient evaporating and concentrating methods. In contrast to these difficulties of charring and the like, the increased efficiency and lower cost of a direct contact, combustion gas concentration plant make it very desirable from the standpoint of economy that some means be devised to permit the use of direct contact, combustion gas concentration in the concentration of charrable heat-sensitive organic and inorganic liquids.

Therefore, it is an object of this invention to provide a method for the concentration of heat-sensitive liquids by direct contact with combustion gases without appreciable charring taking place.

It is another object of this invention to provide a method of cooling hot combustion gases prior to direct introduction thereof into a charrable heat-sensitive liquid being concentrated.

An additional object of this invention is to provide apparatus for carrying out the introduction of partially-cooled combustion gases into a charrable organic liquid being concentrated whereby the said liquid is not affected by charring.

It is a further object of this invention to provide an apparatus for carrying out the introduction of partially-cooled combustion gases into a charrable organic liquid being concentrated whereby such liquid is not affected by charring and, in addition, for causing such liquid to be continuously recirculated and mixed.

Additional objects, if not specifically hereinafter pointed out, will be apparent to one skilled in the art from the following detailed description of the invention:

Generally, the invention resides in the provision of a method and apparatus for cooling down incoming hot combustion gases, prior to contact thereof with the liquid to be concentrated, to a sufficiently low temperature to prevent charring of the organic liquid being concentrated upon contact therewith of the said gases. More specifically, the present invention provides a method and apparatus whereby the incoming hot combustion gases are passed into an annular zone, positioned about the base of an evaporator body, in heat exchange relationship with previously-formed, partially-cooled combustion gases contained within a concentric annular zone positioned between the first-mentioned zone and the liquid to be concentrated. The hot gases are cooled by this heat exchange relationship and are continuously displaced from the first-mentioned zone into the second zone where they are in heat exchange relationship with the heat-sensitive liquid being concentrated—said gases, in turn, continuously displacing the previously-formed gases, which have been further cooled to a noncharring temperature by indirect heat exchange with said liquid being concentrated, and forcing said gases into direct contact with the heat-sensitive liquid being concentrated. Means are also provided, in some cases, for causing recirculation of the liquid being constructed and still further cooling of the hot gases, as will be hereinafter pointed out.

It is believed that both the method of the invention and the apparatus for carrying out such method will be more clearly understood from the following detailed description of the drawings:

Figure 1:
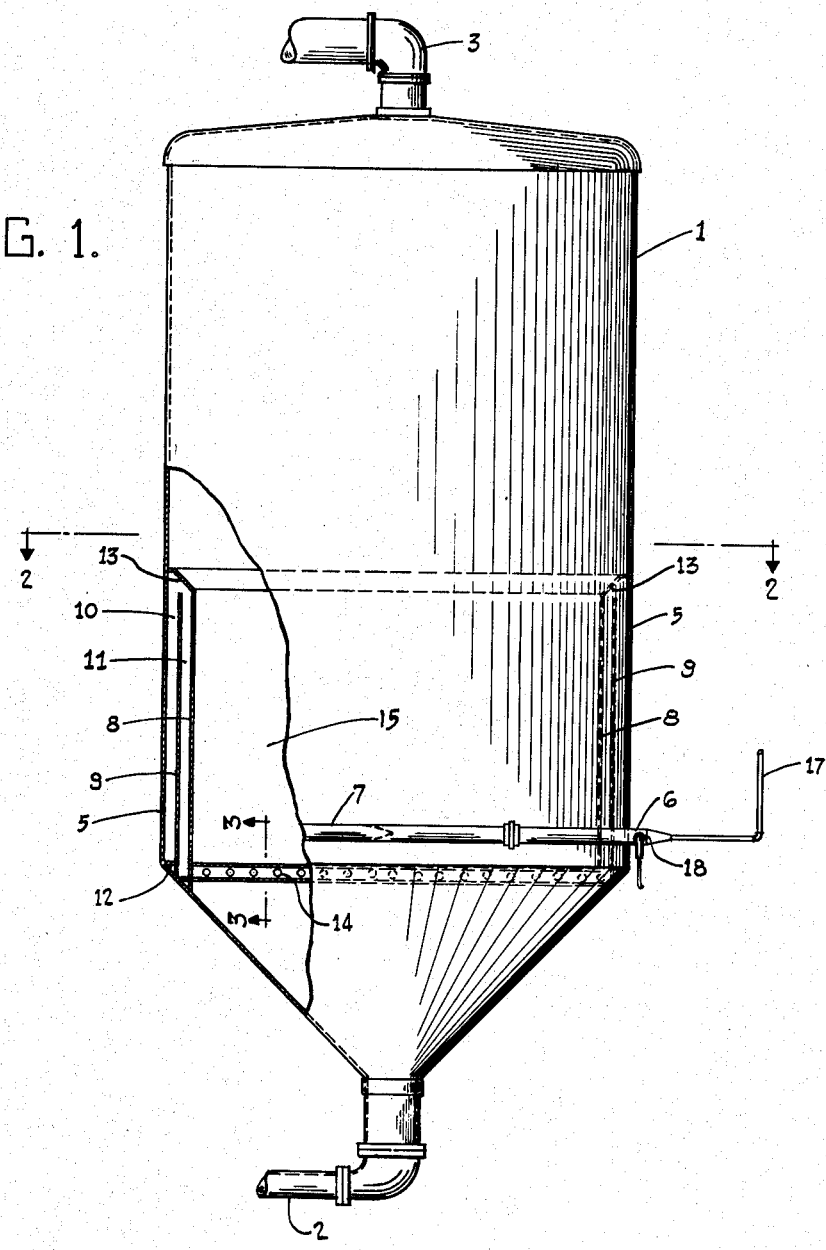
Figure 1 is a side elevational view partly in section of an evaporator equipped with the novel heat exchange and gas introduction means of this invention.
Figure 2:
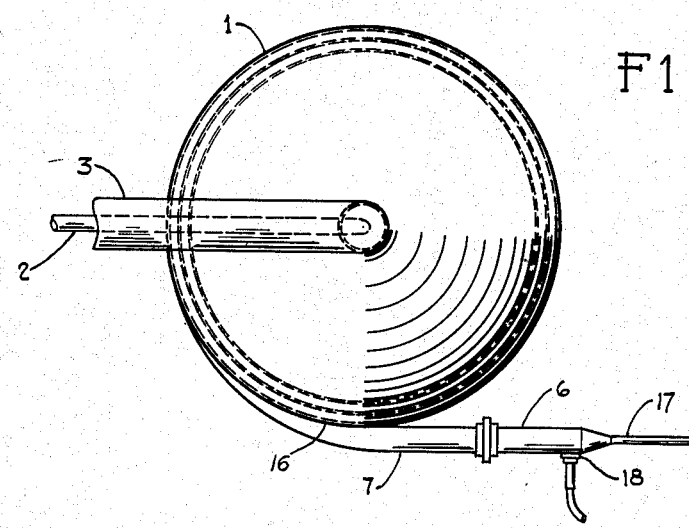
Figure 2 is a top plan of the apparatus of Figure 1.
Figure 3:
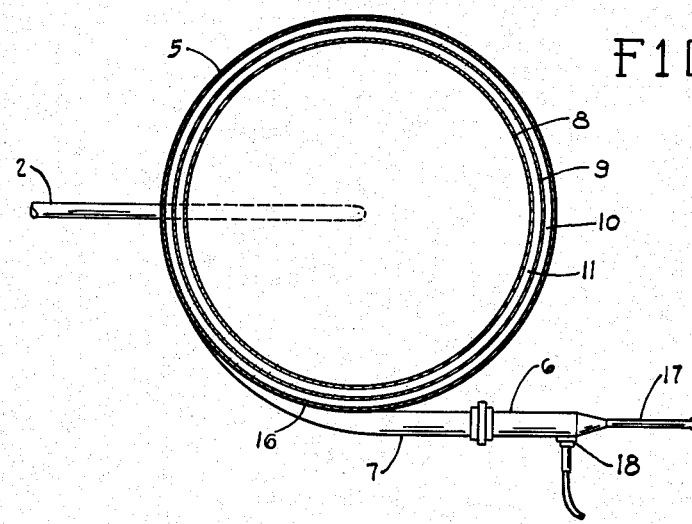
Figure 3 is a horizontal sectional view substantially on the line 2—2 of Figure 1.
Figure 4:
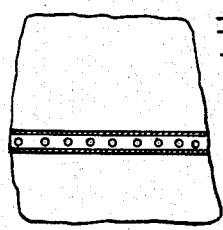
Figure 4 is an enlarged partial vertical sectional view taken on line 3—3 of Figure 1 and illustrating the orifice means whereby the gases finally come into direct contact with the liquid being concentrated.

Referring now to Figures 1 through 4, there is illustrated a conventional evaporator 1 having a concentrate removal line 2 and vapor take-off line 3. Mounted within the base of the evaporator shell 1 is the apparatus which forms a part of the present invention. This comprises essentially a heat exchange means 5 and an associated burner 6 mounted outside of the evaporator body and connected to the heat exchange means through line 7. The heat exchange means itself comprises a pair of concentrically-mounted, annular plates, 8 and 9, so positioned as to leave a small space therebetween and forming with the evaporator shell 1 a pair of annular passageways 10 and 11. Passageway 10, which will be hereinafter referred to as the outer zone, is closed at the base thereof by means of annular plate 12. A connecting port or passage 13 is provided at the top of the outer zone 10 between the said outer zone and the passageway 11 hereinafter referred to as the inner zone. The said inner zone 11 is provided at the base thereof with a plurality of orifices 14 which connect the said inner zone 11 with the body portion 15 of the evaporator. The line 7 from the burner 6 is connected to the outer zone 10 at 16 as is most clearly shown in Figure 3. A line 17 is provided to furnish the burner 6 with fuel. Ignition means are indicated generally at 18 and may comprise an electrical igniter or any other suitable device.

In operation, fuel is supplied to the burner 6, ignited by means 18, and the hot, gaseous combustion products passed through line 7 into outer zone 10. These hot gases are generally at a temperature in the neighborhood of 1800–2800° F. as they leave the burner. At such a temperature, immediate charring would take place if the hot gases came into direct contact with the organic liquid being concentrated. However, by means of the present invention, such direct contact is not permitted until the gases have been cooled to a noncharring temperature, which may be about 500° F. The hot gases pass tangentially into the outer zone 10 and spiral upwardly through said zone, losing some of their heat content by conduction and radiation through annular plate 9, to the previously-formed, partially-cooled gases contained within inner zone 11 defined by plates 8 and 9. The hot gases pass through the port or opening 13 into the inner zone 11 displacing the previously-formed gases contained therein and forcing the said gases through ports or orifices 14 into the heat-sensitive liquid contained within the evaporator body 15. The gases passing downwardly through inner zone 11 give up a considerable portion of their heat by conduction and radiation through the annular plate 8 to the liquid in body 15. The gases entering the liquid through orifices 14 have been cooled to such an extent by passing through the aforementioned annular zones that there exists no appreciable danger of charring the heat-sensitive organic or inorganic liquid being concentrated.

As may be seen from the foregoing description of the novel combustion gas introducing means of this invention, there is involved, first, a gas-to-gas indirect heat transfer and, second, a gas-to-liquid indirect heat transfer prior to actual direct contact of the combustion gases with the liquid being concentrated.

Figure 5:
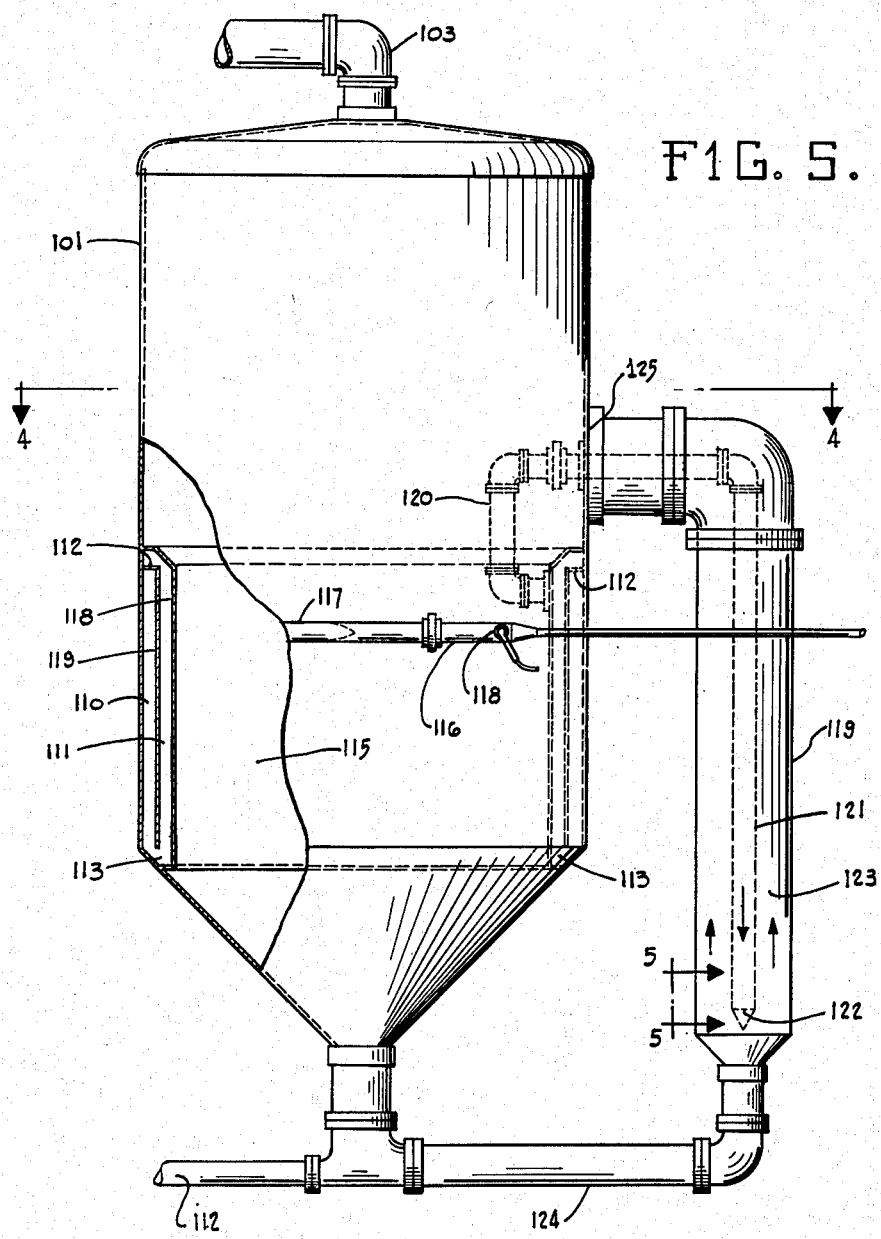
Figure 5 is a side elevational view partly in section of an evaporator equipped with a modified version of the apparatus of this invention, including means to effect circulation of the liquid being concentrated.
Figure 6:
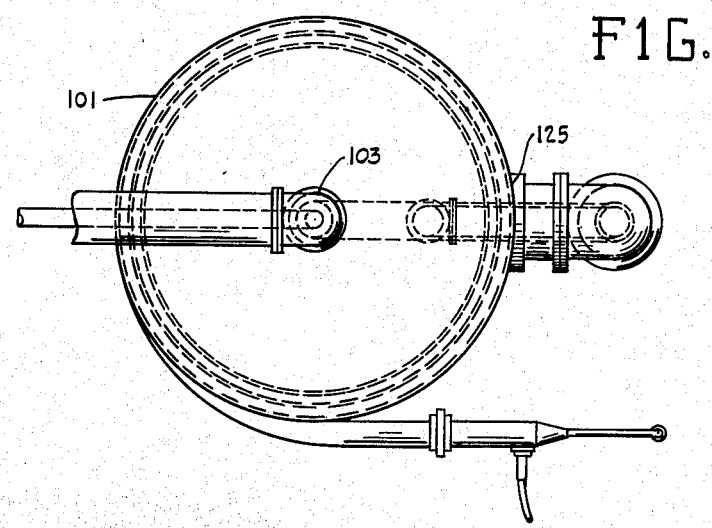
Figure 6 is a top plan of the apparatus of Figure 5.
Figure 7:
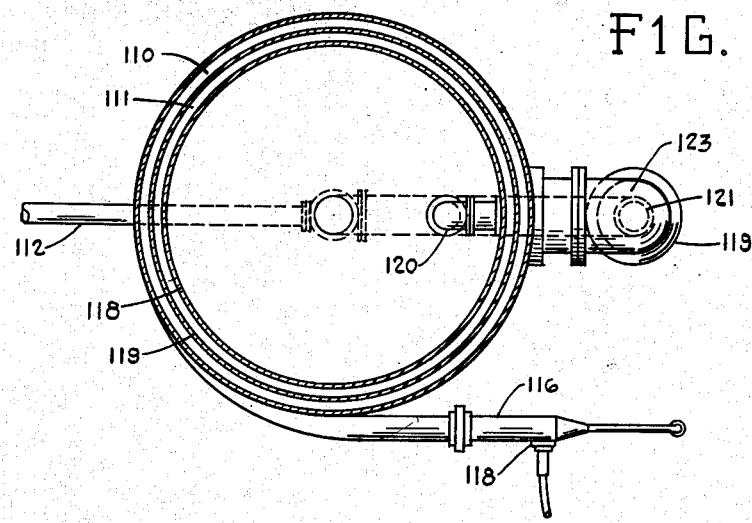
Figure 7 is a horizontal sectional view taken on line 4—4 of Figure 5.
Figure 8:
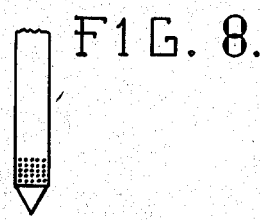
Figure 8 is an enlarged vertical sectional view taken on line 5—5 of Figure 5 and illustrating the combustion gas outlet orifices through which the gas finally contacts the liquid being concentrated.

It is possible that in some instances, as in the concentration of an extremely heat-sensitive liquid, the foregoing apparatus would not be sufficient to reduce the temperature of the hot gases to the desired extent. There is provided, therefore, a modification of such apparatus which will still further reduce the temperature of the said gases. Referring now to Figures 5 through 8, there is shown the said modified form of the apparatus. The heat exchange system is essentially the same as that disclosed in Figures 1 through 4 with two exceptions. In this modified version, the outer zone 110 is closed at the top by plate 112 instead of at the bottom, with the passageway or port 113 at the bottom of the zone 110; and the orifices or ports 14 are omitted. The operation of this apparatus will follow that described for the apparatus of Figures 1 through 4, except that the direction of flow of the gases is reversed. However, when the gases have passed through first the outer zone 110 in a downwardly spiralling direction and thence upwardly through inner zone 111, the operation of this apparatus becomes slightly different. In order to cool the gases still further and, in addition, to provide more agitation and circulation of the liquid within evaporator body 115, there is provided an external side-arm circulator 119. The partially-cooled gases pass from inner zone 111 through pipe 120 into the small concentrically-mounted interior pipe 121 of the circulator 119. This circulator works on the air-lift principle. That is, the partially-cooled gases entering pipe 121 pass downwardly therethrough and out through orifices or ports 122 into the annular body portion 123 of the circulator. The gases rise through the said annular body portion 123, causing the liquid contained therein to rise also, thus establishing a circulation. The liquid enters the circulator through pipe 124 leading from the base of the evaporator 101 and then re-enters the evaporator through the top connection 125 of the circulator with the evaporator body.

It will readily be seen that using the modified apparatus disclosed in Figures 5 through 8, a considerably greater cooling of the gases may be effected. In addition, the increased agitation and circulation of the liquid being concentrated tend to still further decrease the possibility of charring of the said liquid. This version of the apparatus would be especially applicable to concentrating heat-sensitive organic liquids.

Although only two modifications of the apparatus have been shown, it is obvious that many changes and modifications therein may be made without departing materially from the spirit and scope of the present invention. For example, the combustion gases may come from a furnace or the like located at some distance from the evaporator rather than from a burner as shown. Likewise, it is obvious that more than two annular heat exchange zones may be provided if desired. Although especially applicable to the dairy industry, this invention is of value to the sugar industry and to other industries concentrating heat-sensitive organic or inorganic solutions.

The advantages inherent in the method and apparatus of the present invention are obvious. Charring of heat-sensitive solutions may be eliminated and at the same time the advantages and economy of direct contact, combustion gas concentration enjoyed. The present invention constitutes a definite advancement in the field of direct contact, combustion gas concentration of organic or inorganic heat-sensitive liquids.

I claim:

1. In a method for concentrating charrable heat-sensitive liquids by direct contact combustion gas heating within a concentration zone, the steps which comprise first passing said hot gases into said concentration zone solely in indirect heat exchange relationship with previously-formed, partially-cooled combustion gases and thereafter in indirect heat exchange relationship with the liquid being concentrated, prior to direct contact with said liquid by said gases and then introducing said gases directly into the liquid being concentrated.

2. A method for concentrating charrable heat-sensitive liquids which comprises continuously passing hot combustion gases through an annular zone in indirect heat exchange relationship only with previously-formed, partially-cooled combustion gases, said previously-formed gases being in indirect heat exchange relationship with the liquid being concentrated, continuously displacing said previously-formed gases with the incoming hot gases which have been partially cooled by their aforesaid heat exchange relationship with said previously-formed gases, and continuously passing said previously-formed gases into direct contact with said liquid to be concentrated at a temperature below the charring temperature of said liquid.

3. A method for concentrating charrable heat-sensitive liquids which comprises continuously passing hot combustion gases through an annular zone in indirect heat exchange relationship only with previously-formed, partially-cooled combustion gases contained within an adjacent annular zone whereby said hot gases are partially cooled, passing said partially-cooled, hot gases from the first-mentioned annular zone in the second-mentioned annular zone wherein further cooling of said gases is effected by indirect heat exchange with the liquid being concentrated, said partially-cooled, hot gases displacing said previously-formed, partially-cooled gases from the second-mentioned annular zone and forcing said previously-formed gases into direct contact with the liquid being concentrated, and repeating the above cycle whereby the heat-sensitive liquid is concentrated by direct contact with combustion gases at a noncharring temperature.

4. Apparatus for concentrating charrable heat-sensitive liquids comprising in combination an evaporator body, a heat exchange means associated with said evaporator body and forming therewith a plurality of closed vertical annular compartments, means providing communication between the said annular compartments at one end thereof, means disposed at a point remote from said end connecting the interior of the innermost annular compartment with the interior of said evaporator body, and means connected to the outermost annular compartment at a point remote from said aforementioned means providing communication between the innermost and the outermost annular compartments whereby hot combustion gases may be introduced therein.

5. Apparatus for concentrating charrable heat-sensitive liquids comprising in combination a liquid-containing evaporator body, heat exchange means positioned within and around said evaporator body and so connected with a source of hot combustion gases as to provide said hot combustion gases passing therethrough with first only gas-to-gas and thereafter gas-to-liquid indirect heat transfer, and ports connecting said heat exchange means with the interior of said evaporator body whereby gases which have been cooled by passage through said heat exchange means are introduced at a non-charring temperature into the liquid contained within said evaporator body.

6. Apparatus for concentrating charrable heat-sensitive liquids comprising in combination a liquid-contaning evaporator body, heat exchange means positioned within and around said evaporator body and so connected with a source of hot combustion gases as to provide said hot combustion gases passing therethrough with first only gas-to-gas and thereafter gas-to-liquid heat transfer, and a circulating means connected to said heat exchange means and forming a part thereof, whereby gases which have been cooled to a noncharring temperature by passage therethrough contact and cause circulation and concentration of the liquid within said evaporator body.

7. Apparatus for concentrating charrable heat-sensitive liquids comprising in combination a liquid-containing evaporator body, a vertical annular plate positioned within said evaporator body and forming a closed vertical annular passageway with the lower portion thereof, a second vertical annular plate positioned within said vertical annular passageway and dividing the same into two vertical annular passageways, means interconnecting the said passageways, means sealing off the ends of said passageways from communication with the interior of said evaporator body, ports in the innermost annular plate providing communication between the interior of the innermost annular passageway and the interior of the evaporator body, and means connecting the outermost annular passageway with a source of hot combustion gases.

8. Apparatus for concentrating charrable heat-sensitive liquids comprising in combination a liquid-containing evaporator body, a vertical annular plate positioned within said evaporator body and forming a closed vertical annular passageway with the lower portion thereof, a second vertical annular plate positioned within said vertical annular passageway and dividing the same into two vertical annular passageways, means interconnecting the said passageways, means sealing off the ends of said passageways from communication with the interior of said evaporator body, a connection between the interior of the innermost passageway and a side-arm circulating means positioned externally of said evaporator body, said circulating means being connected at the top and bottom thereof with the liquid-containing evaporator body, and means connecting the outermost annular passageway with a source of hot combustion gases.

9. Apparatus for concentrating charrable heat sensitive liquids comprising in combination a liquid-containing evaporator body; heat exchange means disposed within said evaporator body and associated therewith, said heat exchange means being so connected with a source of hot combustion gases as to first provide said hot gases passing therethrough with only gas-to-gas and thereafter with gas-to-liquid heat transfer with the liquid being concentrated prior to direct introduction of said gases into said liquid; and means for introducing said gases from said heat exchange means directly into said liquid being concentrated.

LOWELL W. PETERSEN.

REFERENCES CITED

The following references are of record in the file of this patent:

UNITED STATES PATENTS

| Number | Name | Date |
|---|---|---|
| 378,598 | Laberie | Feb. 28, 1888 |
| 1,594,324 | Payne | July 27, 1926 |
| 1,650,122 | Grantsdorffer | Nov. 22, 1927 |
| 2,092,470 | Peebles | Sept. 7, 1937 |
| 2,342,419 | Martin | Feb. 22, 1944 |
| 2,473,641 | Feldstein | June 21, 1949 |
| 2,544,885 | Jacoby | Mar. 3, 1951 |